Figure 1A:
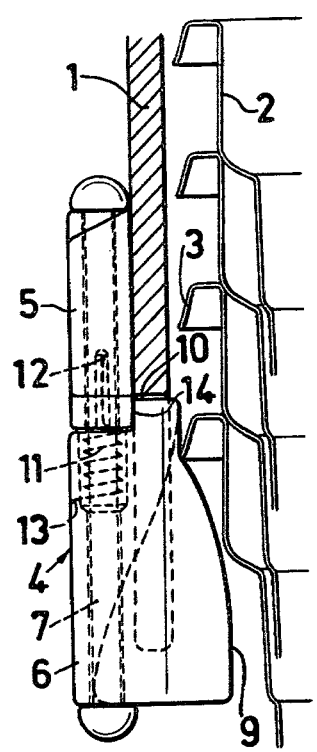

United States Patent [19]

Funke et al.

[11] 4,300,704
[45] Nov. 17, 1981

[54] BLOCKING DEVICE FOR USE WITH CUP RECEPTACLES

[75] Inventors: Gustaf Funke; Bernt Hendberg, both of Karlskoga, Sweden

[73] Assignee: JiHaPläst Johnson Juls AB, Karlskoga, Sweden

[21] Appl. No.: 119,727

[22] Filed: Feb. 8, 1980

[30] Foreign Application Priority Data

Feb. 19, 1979 [SE] Sweden ................ 7901466

[51] Int. Cl.³ .................. A47F 1/08; B65G 59/10
[52] U.S. Cl. .................. 221/301; 221/307; 414/129
[58] Field of Search ............ 221/22, 221, 222, 223, 221/267, 297, 301, 307–310; 414/125, 126, 129

[56] References Cited

U.S. PATENT DOCUMENTS 1,950,382  3/1934  Benson ............................ 221/297
2,298,884  10/1942  Hope ............................ 221/301 X

FOREIGN PATENT DOCUMENTS 767997  9/1967  Canada ............................ 221/310

*Primary Examiner*—F. J. Bartuska
*Attorney, Agent, or Firm*—Pollock, Vande Sande & Priddy

[57] ABSTRACT

The invention relates to blocking device for use with a receptacle for cups pilable in each other. Upon discharge of the lowest cup, the next lowest cup is blocked. The blocking device is pivotable about a vertical axis and is provided with a curved surface or edge so shaped and positioned that upon the discharge of the lowest cup from the receptacle, the collar of said cup slides on the curved surface or edge and causes a rotation of the blocking device in a horizontal direction inwardly below the collar of the next lowest cup. After this occurs, a spring causes the blocking device to return to its normal position.

4 Claims, 4 Drawing Figures

BLOCKING DEVICE FOR USE WITH CUP RECEPTACLES

The present invention relates to a blocking device for use with a receptacle for cups, preferably made of plastic, pilable in each other and having an external collar, bead or the like. The receptacle, which is normally arranged vertically, is preferably provided with a cup at one end and is provided with blocking means at the opposite end for discharging each cup one by one.

Usually, blocking means for use with such receptables act in contraction on the cup collar, which accordingly must have a certain elasticity. In order to overcome the resistance such contraction causes upon the discharge of a cup, the hand grip on the cup must often be so forceful that several cups are discharged. In order to overcome this problem blocking means have been made heretofore which block the next lowest cup upon discharge of the lowest cup. These prior blocking means have been formed as spring elements or arms which, upon the discharge of the lowest cup, are forced to be moved inwardly below the collar of the next lowest cup. In order to perform this movement, these prior blocking means have been arranged to be turnable about a horizontal axis, which has resulted in the movement of the blocking means inwardly below the collar becoming associated with a movement also in vertical direction. Such a movement results in a displacement vertically of the whole pile of cups supported by the blocking means and may cause deformation of the collar of the next lowest cup. Due to this, the blocking means may also jam in its blocking position and hinder further discharge of cups. Moreover, these known blocking means formed as spring means or arms involve a rather complicated construction, which in addition causes possible fatigue of the blocking means after a comparatively short time with the result that the blocking means does not function satisfactorily.

The present invention eliminates the above mentioned disadvantages by the provision of a blocking means which is simple in construction and reliable in its function.

Figure 2A:
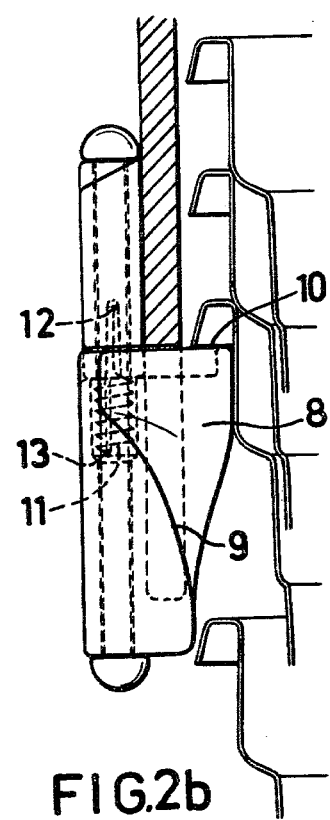
Figure 1B:
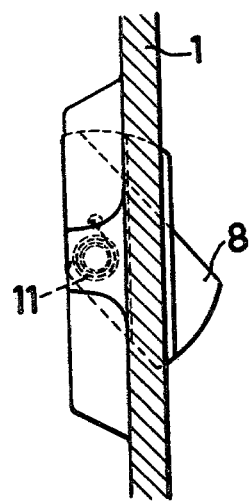
Figure 2B:
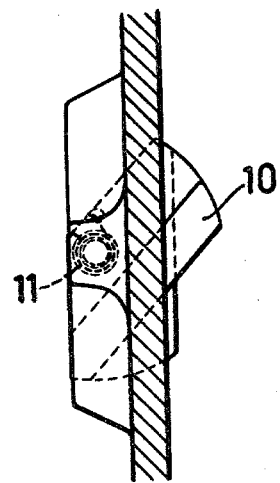

A preferred embodiment of the invention is described below with reference to the accompanying drawing, in which FIG. 1a shows a vertical section and FIG. 1b a horizontal section of the blocking device of the present invention in a normal blocking position, in which the blocking device holds all cups positioned in the receptable, and FIGS. 2a and 2b show in corresponding sections the blocking device in position when the lowest cup in the receptacle has just been discharged from the receptacle.

FIG. 1 shows a wall 1 of a receptacle, in which a number of cups 2 are piled in each other. The inside dimension of the receptacle is somewhat larger than the external dimension of the cups and the shape is the same, for instance round or rectangular. The cups are provided with a collar 3, bead or the like.

The receptacle is shown vertically arranged and at the bottom edge of the receptacle is the exemplified embodiment of a blocking device according to the present invention, generally designated with the reference numeral 4, fixed in some appropriate way. The blocking device consists of a bearing body 5, shown as a plate, which is fixed to the receptacle wall 1, and a blocking body 6, which is pivoted about an axis 7 arranged through the bearing body 5 and the blocking body 6 and extending substantially parallel with the wall 1. The blocking body 6 has a curved surface 8, which as shown is bounded by a curved edge 9. This edge can be acute in cross section or consist of a narrow surface. The curved surface 8 and edge 9 extend from the abutment of the cup collar 3 along an acute angle relative to the wall 1 and successively change in direction to be more and more parallel to the wall 1. The edge 9 can be said to extend along a screw line. Moreover, the blocking body 6 has a top horizontal surface 10. A helical spring 11 is arranged around the axis 7 and is fixed at its end 12 and 13 in the bearing body 5 and the blocking body 6, respectively. In the position shown in FIG. 1, the blocking body 6 is pressed by means of the prestressed spring 11 against a surface 14 of the bearing body 5.

The curved surface 8 with the edge 9 is shaped such that upon discharge of the lowest cup, wherein the collar 3 slides along a slide surface created by the surface 8 or the edge 9, the blocking body 6 will rotate about the axis 7. During this rotation, the spring 11 will be stretched. The term slide surface refers to the surface or the line, along which the collar 3 and the blocking body 6 have contact with each other during the sliding.

FIG. 2 illustrates the position of the blocking body 6 after the rotation thereof to the blocking position. The top horizontal surface 10 of the blocking body has such a shape that, upon the rotation of the blocking body, the surface 10 is moved below the collar of the next lowest cup and this movement of the surface 10 takes place in a horizontal direction. The curvature of the surface 8 or the edge 9 can be adapted such that the movement inwardly of the surface 10 takes place with desired movement dependent of the vertical distance between the collars of the cups in the pile. A blocking device with varying curvature of the surface 8 can be provided, whereby the receptacle can easily be adapted to cups with different collar shapes and thereby different vertical distances between cups in the pile.

As soon as the collar of the lowest cup being discharged has left its contact with the curved surface 8 or edge 9, the spring 11 turns the blocking body 6 back from the position shown in FIG. 2 to the normal position shown in FIG. 1.

The invention is not limited to the embodiment described above and shown on the drawing but can be varied in several ways within the scope of the following claims. For instance, the spring can be shaped and arranged in another way.

We claim:

1. Blocking means for use with a receptacle for cups pilable in each other and having an external collar, bead or the like, said blocking means being positioned at the discharge opening of the receptacle and including a blocking body having two spaced apart blocking surfaces, one of said surfaces being arranged for holding in a normal position all cups in the receptacle and forming a slide surface for the collar of the outermost cup in said receptacle when said outermost cup is being discharged from said receptacle through said discharge opening, said slide surface being, during the discharge of each of the cups, displaced outwardly laterally of the discharge direction, and the second blocking surface upon the displacement of the slide surface being arranged to be displaced inwardly inside of the collar of the next adjacent cup before this next cup reaches said second blocking surface, said blocking body being provided with spring means, against the action of which the blocking surfaces are displaced and which returns the blocking body to said normal position after a cup being discharged has left the slide surface, said blocking body being mounted for rotation about an axis extending substantially parallel to the discharge direction, and said slide surface from the abutment thereof against the collar in the normal position extending at an acute angle to the discharge direction and successively changing in direction to an orientation which is more and more parallel to the discharge direction.

2. Blocking means according to claim 1, wherein said second surface extends substantially perpendicular to the discharge direction.

3. Blocking means according to claim 1 or 2, wherein said spring means holds in said normal position the blocking surfaces with prestressing force.

4. Blocking means according to claim 3, including a bearing body disposed adjacent to said blocking body, said spring means comprising a helical spring arranged about said axis and having its opposite ends attached to said bearing body and said blocking body, respectively.

* * * * *